Sept. 12, 1961    E. NOBINGER    2,999,644
PORTABLE SPRINKLING DEVICE
Filed April 7, 1959    2 Sheets-Sheet 1
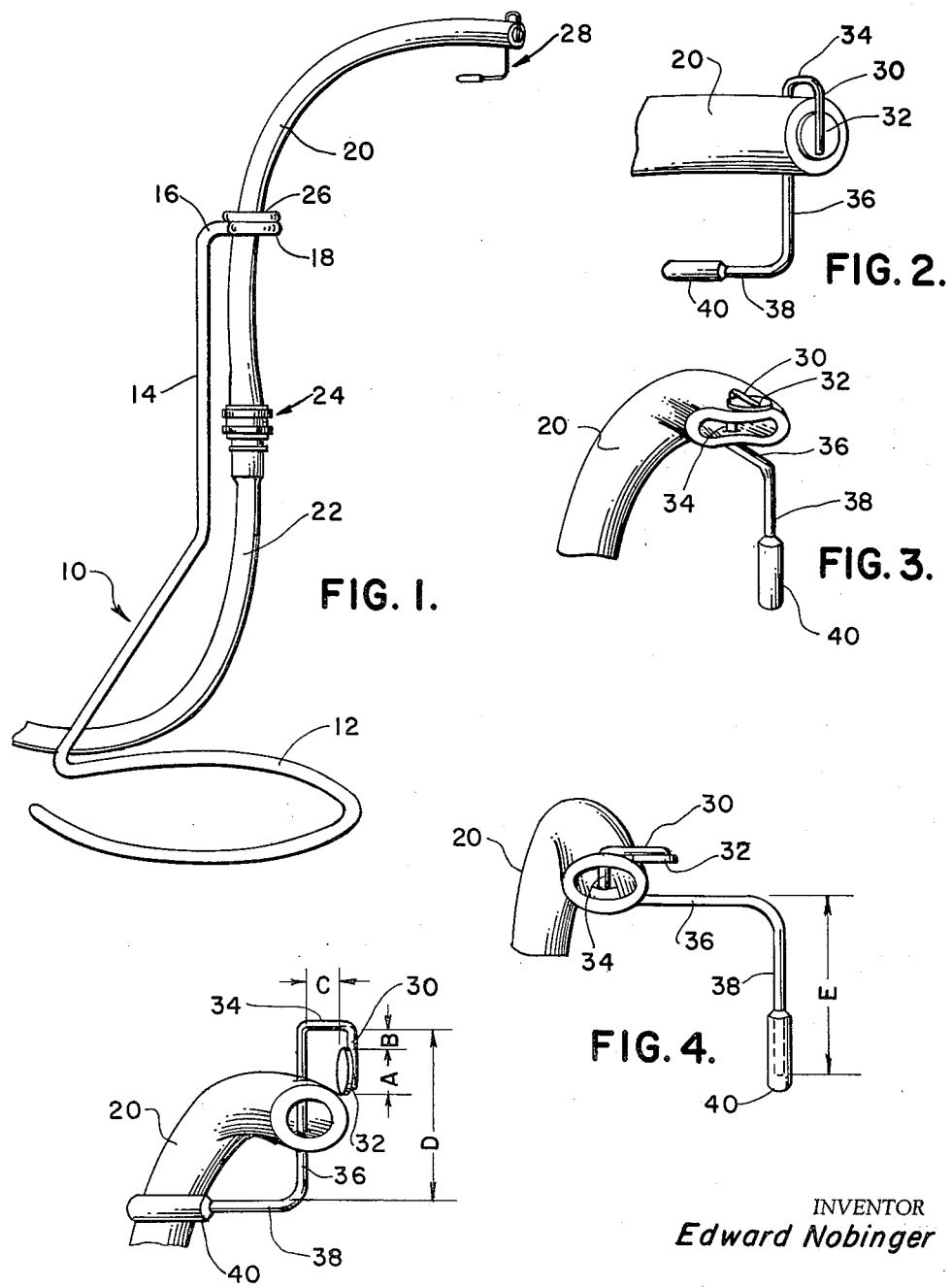
INVENTOR
*Edward Nobinger*
BY
*Diggins & LeBlanc*
ATTORNEYS

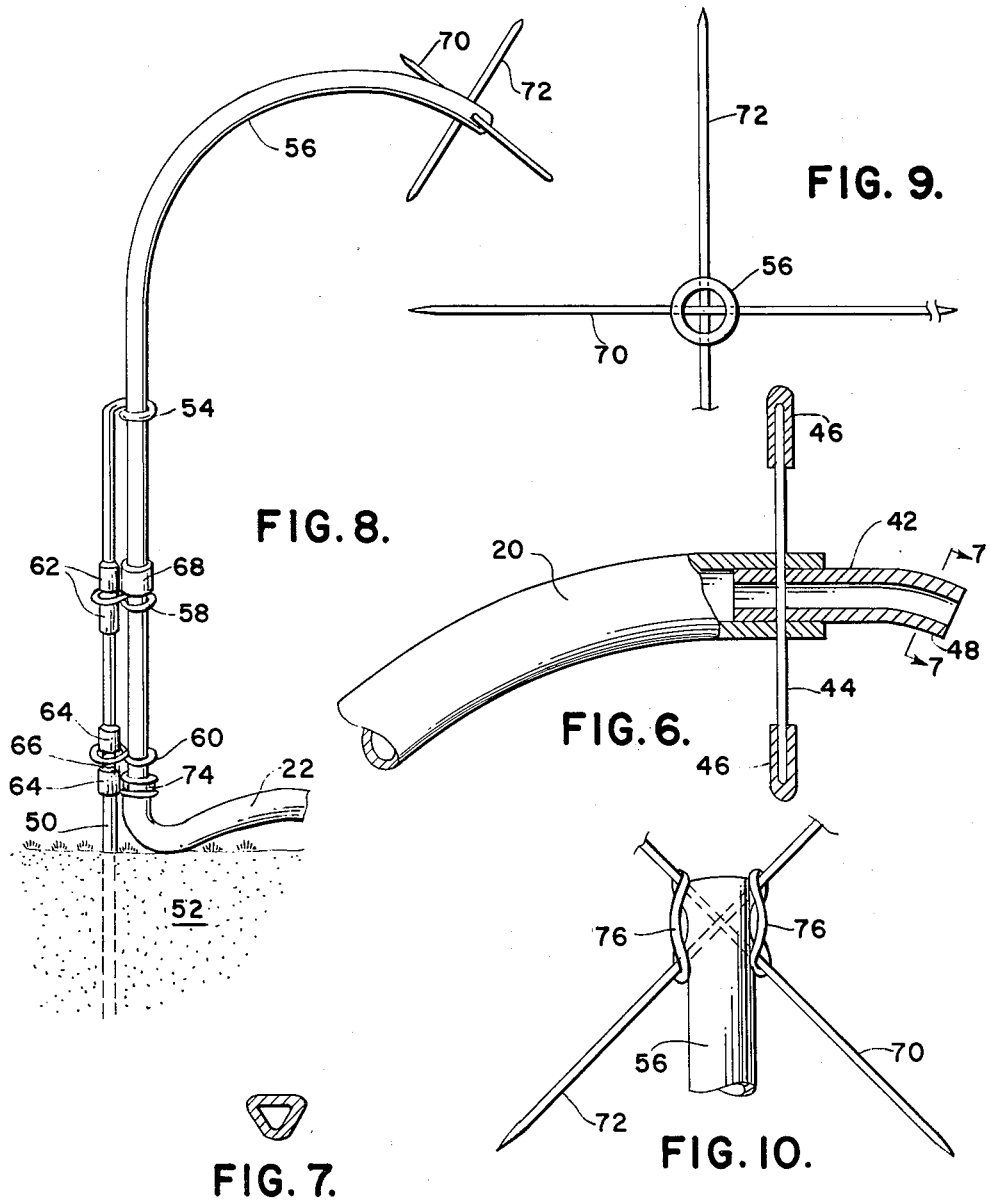

United States Patent Office 2,999,644
Patented Sept. 12, 1961

2,999,644
PORTABLE SPRINKLING DEVICE
Edward Nobinger, 1731 Mims Ave. SW.,
Birmingham, Ala.
Filed Apr. 7, 1959, Ser. No. 805,117
20 Claims. (Cl. 239—229)

This invention relates to a lawn sprinkling apparatus and valve means therefor and more particularly relates to a lawn sprinkling apparatus of the type employing an unsupported length of hose which whips about to provide a large sprinkling area.

This is a continuation-in-part of my patent application Serial No. 713,385 filed February 5, 1958, now abandoned, and entitled Portable Sprinkling Device.

As noted in my aforesaid application, it has previously been proposed to form a lawn sprinkler by attaching a hose to a vertical support with the end of the hose unsupported in order that it may whip about and sprinkle a large area of lawn. However, the devices of this type of which I am aware have not been satisfactory for a variety of reasons. Perhaps the most important difficulty has been their unsatisfactory response to variations in water pressure, many simply bursting with an increase in pressure. In addition to this, the whipping action has frequently been inadequate and in practically all cases there has been a lack of simple adjustability. I have also found that far superior results can be obtained by using a rod-like deflector which leaves the unrestrained end of of the hose relatively unconfined. Moreover, the deflector must be sufficiently light so as not to cause overdamping of the oscillations of the free end of the hose. At the same time, the rod-like deflector must not be too light in weight because if this condition prevails the portion inserted into the hose will bend and be unsuitable for use. A very flexible hose must be utilized to provide a large variety of sprinkling patterns and for optimum operation a means should be provided for adjusting the length of the unsupported hose section. In addition to the foregoing the entire unit must be susceptible of manufacture at a low cost and must be of a durable and rugged nature.

It is accordingly a primary object of the present invention to provide a lawn sprinkling apparatus utilizing a length of resilient unsupported hose having a deflector at the end thereof which includes a portion of the deflector extending transversely of the hose.

It is another object of the present invention to provide a fluid discharge nozzle having a deflector which is selectively movable to a number of positions each of which provides a different spray pattern.

It is another object of the present invention to provide a fluid discharge nozzle having a combination valve and deflector which is used to control the size of the droplets in the spray pattern.

It is another object of the invention to provide a lawn sprinkling apparatus utilizing a length of resilient unsupported hose which is attached to a stand provided with means for adjusting the length of the unsupported hose section.

It is another object of the invention to provide a lawn sprinkling apparatus utilizing a length of resilient unsupported hose having a deflector at the end thereof and being supported in such a manner as to permit a large variety of types of spray and sprinkling patterns.

The above and still further objects, features and advantages of the present invention will become apparent upon consideration of the following detailed description of specific embodiments thereof, especially when taken in conjunction with the accompanying drawings, wherein:

FIGURE 1 is a perspective view of the sprinkling apparatus of the present invention disclosing the hose and stand arrangement;

FIGURE 2 is an enlarged view of the free end of the hose and deflector means shown in FIGURE 1;

FIGURES 3–5 show various other possible positions for the deflector means of FIGURES 1 and 2;

FIGURE 6 is a side elevational view, partly in section, showing another embodiment of the invention;

FIGURE 7 is a cross sectional view of the deflector tube of FIGURE 6 taken along the lines 7—7;

FIGURE 8 is a side elevational view of an embodiment of the present invention showing another hose and stand arrangement;

FIGURE 9 is a front view of the end of the hose illustrated in FIGURE 8 drawn to an enlarged scale and showing in detail the placement of the deflector rods in the end of the hose;

FIGURE 10 is a side elevational view showing still another embodiment of the present invention; and FIGURE 11 is an end view of the hose and rod arrangement illustrated in FIGURE 10 with the rubber bands crossed.

Referring now to FIGURE 1 of the accompanying drawings, there is provided a metallic stand indicated generally at 10 provided with a circular base 12 which is adapted to rest upon the ground. The stand is provided with a vertically extending portion 14 which is bent at 16 where there is formed a laterally extending eyelet 18.

A hose 20, of a type to be described in greater detail hereinafter, is inserted into the opening in eyelet 18 preferably by leaving a portion of the eyelet open an amount slightly less than the outer diameter of hose 20 so that the hose may be inserted and removed laterally into the eye of the eyelet. Hose 20 is connected to a section of garden hose 22 and joined thereto by a standard hose coupling connection indicated generally at 24. A washer 26 preferably made of rubber rests on eyelet 18 and is supported thereby. Washer 26 frictionally engages hose 20 which is capable of being moved manually therethrough in a longitudinal direction. Thus, it is possible to vary the length of hose 20 which extends above eyelet 18 to vary the area covered in a particular spray pattern. The unrestrained end of hose 20 is provided with a deflector indicated generally at 28.

Referring now to FIGURE 2, there is shown an enlarged view of the unrestrained end of the hose and the unique deflector of my invention. The deflector consists of a bent rod or wire and is preferably made of a corrosion resistant material such as stainless steel. The deflector is shown to consist of a short disc carrying leg 30 to which is fixedly attached a disc 32 by any suitable means such as by spot welding. A base member 34 interconnects the short disc carrying leg 30 with a longer leg 36. Leg 36 extends diametrically across and through hose 20 and is provided with a handle member 38 to which is applied a plastic tip 40 in frictionally engaging relationship.

The length of base member 34 is such that when leg 36 extends through the end of hose 20 and when base member 34 extends parallel to the longitudinal axis of hose 20 disc 32 is positioned closely adjacent but slightly exterior of the opening in the unrestrained end of the hose 20.

The assembly and operation of the sprinkling apparatus with the deflector in the position of FIGURES 1 and 2 is as follows:

A convenient length of garden hose 22 is connected to a source of water and connected to hose 20 by coupling 24. Hose 20 is moved laterally through the opening of eyelet 18 into the eye thereof and by holding rubber washer 26 the length of hose 20 above eyelet 18 is established for the desired area of the spray pattern. Deflector 28 is positioned adjacent the free end of hose 20 by inserting the handle member 38 with tip 40 removed and continuing the insertion until leg 36 assumes the position shown in FIGURE 2 after which tip 40 is applied to the handle member 38. The diameter of disc 32 is substantially equal to the inner diameter of the hose 20, and is spaced from the end a very short distance such as 1/16 of an inch for a 3/8 inch inner diameter hose and 3/8 inch disc. When the water is turned on, an extremely fine mist spray is obtain from this arrangement which is ideally suited for newly planted gardens, potted plants, areas of seeded grasses and as a children's play shower.

Reference is now made to FIGURES 3—5 which show various other possible positions for the deflector 28 of FIGURE 1. Thus, in FIGURE 3, the insertion of the deflector into the end of tube 20 has been continued until base member 34 extends across the opening in hose 20. The length of base member 34 is such that in this position legs 30 and 36 compress the end of hose 20 to such an extent that in operation a 180 degree whip motion is obtained. The droplets of water obtained when the deflector is in this position are small and its 180 degrees whip motion is ideal for watering along walkways or for watering all types of shrubbery and flower gardens.

The position shown in FIGURE 4 is obtainable from that shown in FIGURE 3 by rotating handle 38 through 90 degrees. In this position, the base member 34 still extends transversely of the opening in the hose 20 but the legs 30 and 36 are positioned normal to the longitudinal axis of hose 20. Thus the hose is compressed to an extent approximately 1/2 of that shown in FIGURE 3 and the opening in the end of the hose is slightly teardrop in shape. This position for the deflector 28 produces medium rain-like droplets in a 360 degrees area. This position is most suitable for watering large lawns, golf courses and parks.

The position of the deflector shown in FIGURE 5 may be obtained directly from the position shown in FIGURE 2 by moving leg 36 vertically upward. The deflector in FIGURE 5 has been shown with a slight rotation about the longitudinal axis of leg 36 for convenience of illustration. It will be noted that in this position the sole obstruction to the flow of water through hose 20 is that provided by the leg 36 which extends diametrically across the hose. In operating the sprinkling apparatus with the deflector as shown in FIGURE 5, large rain-like droplets are obtained in a 360 degree circle. The area of the spray pattern for this position for a given pressure is a minimum and this position is suitable for complete soaking of large areas that contain sandy soil.

The hose 20 shown in the embodiment of the invention in FIGURES 1 through 5 is preferably made of neoprene and its inner diameter may vary from 3/8 of and inch to 1 inch. Other properties required of the flexible tubing is a tensile strength of at least 4,500 lbs. per square inch, an elongation of at least 850% and a durometer reading (Shore A) of from 30 to 40. Although the length of the flexible tubing for hose 20 may vary, a length of 16 inches has been found to be desirable which permits a length of tubing above eyelet 18 of from 1/2 inch to 14 1/2 inches.

Reference is made to FIGURES 4 and 5 for the typical dimensions A through E for a neoprene hose 20 having a 3/8 inch inner diameter and 5/8 inch outer diameter. Circular disc, 32 has a diameter A of 3/8 of an inch and has a depth of 1/32 of an inch. The dimension B from the end of disc 32 to base portion 34 is 1/4 of an inch. The dimension C from the underside of disc 32 to leg 36 is 5/16 of an inch. The length of leg 36 indicated dimension D is 1 1/2 inches. The length of handle 38 indicated as dimension E in FIGURE 4 is 1 inch. The deflector itself is made of stainless steel having a wire thickness of .080 inch. The entire weight of the deflector is important and it has been found that a deflector weighing less than 36 grains is unsuitable when using a 3/8 inch inner diameter tubing because it will bend under the pressure range which is contemplated as being from 10 to 150 lbs. per square inch. Also a deflector weighing more than 72 grains which is only in the order of 1/6 of an ounce, is too heavy when using a 3/8 inch inner diameter tubing for hose 20 since it is too heavy and causes excessive damping in the movement of the free end of hose 20.

The washer 26 when used with a neoprene hose 20 having a 3/8 inch inner diameter and 5/8 inch outer diameter is made of rubber and has a 1 3/8 inch outer diameter and 1/2 inch inner diameter and a thickness of 1/8 of an inch. Similarly, eyelet 118 has an eye diameter of 1/2 inch and a 5/16 inch opening at its end to admit the 5/8 of an inch outer diameter neoprene hose 20.

The dimension C is such as to leave a 1/16 of an inch clearance between the end of hose 20 and the deflector disc 32 when the deflector is in the position indicated in FIGURES 1 and 2. This clearance of 1/16 of an inch is correspondingly greater when larger diameter tubes are used for hose 20. Thus, on a 1/2 inch inner diameter tubing the clearance between the end of hose 20 and deflector disc 32 is 1/8 of an inch. Similarly, when a 1 inch inner diameter tube is used, the clearance is increased to 1/4 of an inch. It is important that all of the corners in deflector 28 shall be rounded so as to permit the deflector to assume each of the positions shown in FIGURES 2—5 with ease and without causing excessive wear on the holes provided in hose 20.

It will be apparent that the deflector disclosed in the present invention functions as a combination valve and deflector in providing a variety of spray patterns and in controlling the droplets issuing from the hose.

Referring to FIGURES 6 and 7, there is shown another embodiment of my invention wherein a deflector assembly consists of a small plastic tube 42 mounted in the end of hose 20 and secured thereto by means of a thin rod 44 extending through the hose and tube. The rod 44 is preferably formed of metal in order to provide the necessary weight and should be at least three times as long as the diameter of the hose 20 in order to secure proper adjustability. The ends of the rod 44 may be covered with plastic caps 46 to prevent scratching by the metal rod ends and the rod is slidable through the hose and tube 42.

Surgical latex rubber may be used for the hose in this embodiment of the invention since it possesses a normal curvature as shown in FIGURE 6 and according to this embodiment of the invention, the tube 42 is also provided with a curved end 48 which is curved in the same direction as the inherent curvature in the hose 20. While the shape of the end of the tube 42 may be in any of a number of forms, I have found that superior results are obtained when the end of the tube is triangular in shape as shown in FIGURE 7. In order to provide an unexpected degree of adjustability the rod 44 passes through the hose and tube approximately in the same plane which contains the radii of curvature of the hose 20 and tube 42. The rod 44 may then be adjusted upwardly and downwardly in FIGURE 6 to provide a large variation in spray patterns. This embodiment of my invention most nearly resembles the position of the deflector shown in FIGURE 5 in the previous embodiment.

Still another embodiment of the present invention shown in FIGURE 8 wherein there is provided a metallic rod or stand 50 which is adapted to be inserted into the ground, indicated generally by the reference numeral 52, and which terminates at its upper end in a loop or ring 54 through which passes a length of flexible hose 56. The hose 56 passes through additional eye-hooks 58 and 60 slidably supported on the stand 50. The hose 56 is frictionally slidable in the eye-hooks 54, 58, and 60, so that the unsupported length of hose 56 above the hook 54 may be readily controlled.

In order to positively retain the eye-hooks 58 and 60 in place on the rod 50, lengths of rubber hose 62 and 64 may be provided above and below the hooks 58 and 60, respectively, on the stand 50. Thus, when the position of the hooks 58 and 60 is to be changed, the length of hose 62 or 64 which lies in the desired direction of movement of the hook is withdrawn, the hook is moved and then the two lengths of hose are brought into engagement with the two sides of the hook to hold it in position. Similarly, a slidable stop member 68 may be disposed about the hose 56 which, when the position of the hose is to be changed, may be placed so that it rests on one of the eye-hooks 54, 58 or 60, the accompanying drawings illustrating the stop member 68 adjacent the eye-hook 58.

The lowest eye-hook 60 is adapted to engage a protrusion 66 on the rod 50 which protrusion is adapted to limit downward movement of the hook 60. As a result, when it is desired to push the rod 50 into the ground, the user may place his foot on hook 60 and push downwardly, the force applied to hook 60 by the foot being transferred to rod 50 through protrusion 66.

The embodiment of the invention shown in FIGURES 8 and 9 is most similar to the position of the deflector shown in FIGURE 5 of the preferred embodiment. In FIGURES 8 and 9, the upper or unsupported portion of the hose 56 is pierced immediately adjacent its end by two rods 70 and 72 which are relatively thin as compared with the cross sectional area of the passageway through the hose 56. Although the rods illustrated in FIGURES 8 and 9 are illustrated as being disposed at right angles to one another, it is to be understood that the invention is not limited to a specific angle between these members. However, an angle between the members 70 and 72 of 90° is preferable, since it produces a maximum reaction in both coordinate directions between the rods and the stream of water issuing from the hose 56 so as to produce maximum movement of the hose 56 in two directions.

The hose 56 is preferably fabricated from surgical latex hosing which has a high degree of resiliency and elasticity and yet is extremely tough. Because of the elasticity and resiliency of the hose, it moves freely as a result of the reaction between the water and the rod 70 and 72, but because of its toughness it has an extremely long life and is not readily subject to puncture. In addition, since the surgical hosing material is extremely elastic, the stop members 62 and 64 and 68 may be fabricated from the same material as hose 56 and may consist of sections of the hose.

In operation, the lower end of the hose 56 is attached to a source of water through a regular hose screw connection 74 and water proceeds through the hose 56 and out the upper end thereof. In the process the water strikes the rod 70 and 72 adjacent the upper end of the hose 56. As in the previous embodiment, the reaction between the water and the deflector means causes the unsupported length of the hose 56 to whip and rotate which results in the water being sprayed over a relatively large area. Again, the precise area which is covered by the water issuing from the hose is determined by several factors including the water pressure and the flexibility of the unsupported length of the hose.

Still another embodiment of the present invention is illustrated in FIGURES 10 and 11 in which the end of hose 56 has its open end distorted so as to provide in effect a spray nozzle on the end. Thus, in FIGURES 10 and 11 the rods 70 and 72 pass through one side of the wall of the hose 56 and out the top of the opening while the other rod passes through a diametrically opposed place in the wall 56, from the rod 72 and out the other edge of the end opening. Rubber bands 76 which again may be a narrow piece of the surgical hosing are passed over the upper end of the rods 70 and 72 and under the lower ends of the rods 72 and 70, respectively, each on a common side of the hose 56 so as to deform the open end of the hose 56 into an elliptical shape. As a result, not only do the rods 70 and 72 produce the whipping motion of the hose, but they also reduce the cross sectional area of the open end and tend thereby to increase the velocity of the water issuing from the hose and therefore produce a spray effect.

The hose illustrated in FIGURES 10 and 11 is supported on a stand which may be of the type shown in either FIGURES 1 or 8 so that the unsupported length of the hose may be readily controlled. An additional feature of this embodiment of the invention is that by choosing the length of the rubber bands 14, the degree of distortion of the hose 56 may be varied and therefore the velocity at which the water issues therefrom may be adjusted. FIGURE 11 discloses the rubber bands 14 crossed which is another simple expedient used to provide adjustability.

It will be noted that in all embodiments of my invention, the exterior of the hose is relatively unconfined so that the spray apparatus is capable of handling a large range of water which flows at widely varying pressure. The reaction between the water and the deflector means causes the unsupported length of the hose to whip and rotate which results in the water being sprayed over a relatively large area. The precise area which is covered by the water issuing from the hose is determined by a number of factors, which include the water pressure and the flexibility of the unsupported length of hose. Thus, in the embodiment shown in FIGURES 1–5, for example, four different spray patterns are obtainable of from 2 feet to 50 feet in diameter dependent upon the pressure which may conveniently be varied from 10 to 150 lbs. per square inch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid sprinkling device comprising a resilient and flexible hose, a stand for mounting on the ground, means attaching said hose to said stand with an end of said hose unsupported, and deflector means attached to said hose and comprising a thin rod-like member in the end of said hose extending transversely thereacross, said deflector means being attached to said hose in such a manner that the periphery of the end of said hose is free to expand when the pressure of the fluid is increased and is held in position in said hose when said hose is in an expanded condition.

2. A liquid spraying device as set out in claim 1 wherein said rod pierces said hose at diametrically opposed positions whereby expansion of said hose does not release said deflector means.

3. A fluid discharge nozzle comprising a flexible hose, a connection for receiving a fluid under pressure at one end of said hose, a valve member at the other end of said flexible hose, said other end of said hose being unrestrained, means for supporting said flexible hose intermediate its ends, said valve member comprising a thin rod-like member having a pair of parallel legs, a base portion interconnecting said pair of parallel legs, a portion of said valve member being insertable into said flexible hose adjacent the unrestrained end thereof, and a circular disc carried by one of said legs, said disc being positioned substantially perpendicular to the plane of said legs.

4. A fluid discharge nozzle set out in claim 3 including means attached to the end of one of said legs remote from said base portion to vary the position of said legs with respect to said flexible hose.

5. A fluid discharge nozzle ase set out in claim 3 wherein said means for supporting said flexible hose includes a rubber washer having an inner diameter slightly less than the outer diameter of said flexible hose and said flexible hose being made of neoprene having a durometer of about 30 to 40.

6. A liquid spraying device as set out in claim 2 wherein said deflector means comprises a tubular member concentric with said hose and attached thereto by said rod which extends through said hose and tubular member.

7. A liquid spraying device as set out in claim 3 wherein said deflector means includes a tubular member within said hose.

8. A liquid spraying device as set out in claim 7 wherein said tubular member extends beyond the end of the hose and is curved at its end.

9. A liquid spraying device as set out in claim 8 wherein said hose has an inherent curvature and the curvature of said tubular member is arranged such that the radii of curvature of the hose and tubular member lie substantially in the same plane.

10. A liquid spraying device as set out in claim 9 wherein said rod lies substantially in said plane.

11. A fluid discharge nozzle comprising a flexible hose, a connector for receiving a fluid under pressure at one end of said hose, a valve member at the other end of said flexible hose, said other end of said hose being unrestrained, means for supporting said flexible hose intermediate its ends, said valve member comprising a thin rod-like member having a pair of parallel legs, a base portion interconnecting said pair of parallel legs, a portion of said valve member being insertable into said flexible hose adjacent the unrestrained end thereof, a circular disc carried by one of said legs, said disc having a diameter substantially equal to the inner diameter of said flexible hose, said disc being movable to a position closely adjacent but exterior to the opening in the unrestrained end of said flexible hose.

12. A fluid discharge nozzle as set out in claim 11 wherein said base portion extends parallel to the longitudinal axis of said flexible hose and out of contact with the outer periphery of said hose.

13. A fluid discharge nozzle comprising a flexible hose, a connection for receiving a fluid under pressure at one end of said hose, a valve member at the other end of said flexible hose, said other end of said hose being unrestrained, means for supporting said flexible hose intermediate its ends, said valve member comprising a thin rod-like member having a pair of parallel legs, a base portion interconnecting said pair of parallel legs, a first one of said legs being insertable into said flexible hose adjacent the unrestrained end thereof and extending diametrically thereacross, a circular disc carried by a second one of said legs, said disc being movable to a position closely adjacent but exterior to the opening in the unrestrained end of said flexible hose.

14. A fluid discharge nozzle as set out in claim 13 wherein said first leg is longer than said second leg and includes means attached to said first leg to move said disc with respect to said hose.

15. A fluid discharge nozzle comprising a flexible hose, a connection for receiving a fluid under pressure at one end of said hose, a valve member at the other end of said flexible hose, said other end of said hose being unrestrained, means for supporting said flexible hose intermediate its ends, said valve member comprising a thin rod-like member having a pair of parallel legs, a base portion interconnecting said pair of parallel legs, said base portion being insertable into said flexible hose adjacent the unrestrained end thereof and extending diametrically thereacross, each of said legs being engageable with the outer periphery of said flexible hose to compress said flexible hose, said legs being pivotal about the longitudinal axis of said base portion to vary the compression of said flexible hose.

16. A fluid discharge nozzle as set out in claim 15 including means to vary the position of said legs with respect to said flexible hose.

17. A fluid discharge nozzle as set out in claim 16 wherein said means to vary the position of said legs with respect to said flexible hose consists of a handle member attached to the end of one of said legs remote from said base portion.

18. A liquid sprinkling device as set out in claim 1 wherein said deflector means comprises a pair of thin rods extending substantially diametrically through said hose.

19. A liquid sprinkling device as set out in claim 1 wherein said deflector means comprises a pair of thin rods, each of said rods extending out of the end of said hose at one side thereof and through said hose at the other side thereof, said rods being in an X shape with respect to one another.

20. A liquid sprinkling device as set out in claim 19 including means for adjusting the angle between said rods.

References Cited in the file of this patent

UNITED STATES PATENTS

| | | |
|---|---|---|
| 1,368,416 | Thomas | Feb. 15, 1921 |
| 1,716,305 | Dillman | June 4, 1929 |
| 2,601,655 | Young | June 24, 1952 |
| 2,758,874 | Snyder | Aug. 14, 1956 |
| 2,792,257 | Davis | May 14, 1957 |
| 2,852,307 | Clark | Sept. 16, 1958 |

FOREIGN PATENTS

| | | |
|---|---|---|
| 596,864 | France | Aug. 17, 1925 |